United States Patent [19]

Niepolomski et al.

[11] Patent Number: 4,870,260
[45] Date of Patent: Sep. 26, 1989

[54] METHOD AND APPARATUS FOR VALIDATING VALUABLE DOCUMENTS

[75] Inventors: Andrzej Niepolomski, Baar; David Greenaway, Oberwil, both of Switzerland

[73] Assignee: LGZ Landis & Gyr Zug AG, Zug, Switzerland

[21] Appl. No.: 898,237

[22] Filed: Aug. 20, 1986

[30] Foreign Application Priority Data

Aug. 21, 1985 [CH] Switzerland ............ 03594/85

[51] Int. Cl.$^4$ .................................. G06F 7/08
[52] U.S. Cl. .................... 235/381; 235/454; 235/494; 235/437
[58] Field of Search ............ 235/437, 381, 454, 449, 235/492, 494

[56] References Cited

U.S. PATENT DOCUMENTS

| | | | |
|---|---|---|---|
| 3,702,464 | 11/1972 | Castrucci | 235/492 |
| 4,172,554 | 10/1979 | Clarinval et al. | 235/494 X |
| 4,211,918 | 7/1980 | Nyfeler et al. | 235/454 |
| 4,231,458 | 11/1980 | Limone et al. | |

FOREIGN PATENT DOCUMENTS

| | | |
|---|---|---|
| 594935 | 1/1978 | Switzerland . |
| 607799 | 10/1978 | Switzerland . |
| 2099756A | 12/1982 | United Kingdom . |

Primary Examiner—David L. Trafton
Attorney, Agent, or Firm—Marmorek, Guttman & Rubenstein

[57] ABSTRACT

The present invention is a method and apparatus for validating a valuable document such as a debit card. The valuable document includes a plurality of value markings arranged to form a code word. Illustratively, the value markings may be optical elements capable diffracting incident optical radiation. Alternatively, the value marking may be electrical elements such as safety fuses, diodes or transistors, the presence or absence of the electrical element representing a logic "1" or logic "0" respectively.

In accordance with the present invention, the code word is first read to determine if it is valid. If the code word is valid, one or more value markings are erased, in each of plurality of erasing steps, until, illustratively after the final erasing step all of the value markings are erased. After each erasing step, the erased and remaining unerased validations markings form a new code word. If the sequence of new code words corresponds to a predetermined sequence of code words a signal is produced. Illustratively, the signal corresponds to a cash value represented by the predetermined sequence of code words.

4 Claims, 3 Drawing Sheets

METHOD AND APPARATUS FOR VALIDATING VALUABLE DOCUMENTS

FIELD OF THE INVENTION

The present invention relates to a method and an apparatus for validating valuable documents such as debit cards.

BACKGROUND OF THE INVENTION

A method and an apparatus for production and identification of valuable documents such as debit cards is disclosed in Swiss Patent No. 594,935. (See for example, column 4, lines 1 through 21).

It is the object of the present invention to improve the known method and apparatus for the mechanical validation of valuable documents. The main object of the method and apparatus being the recognition of forgeries, so that forgeries can be better recognized and so that deliberate and accidental manipulations of genuine valuable documents in validation machines (e.g. readers) can be prevented.

Valuable documents include documents that can be read by machine. Such documents carry intelligence (i.e. information) that can be cancelled by machine. Typically, such documents are used for cashless payments for goods and services and may include, for example, transportation and entrance tickets, and credit cards.

In the latter case, the credit card often includes a multitude of cash value units in the form of coded intelligence that are used for the prepayment of services, for example, for prepayments of electricity, gas or water usage or for prepayment of a telephone call in a public phone booth. If the service is rendered, the value units that comprise coded intelligence are read and validated by a mechanical reader in order to be totally or partially cancelled according to the value of the rendered service.

So far, considerable expenditures have been taken, for instance by using holograms, in order to render valuable documents forgery-proof. Since reading and cancellation of cash value units heretofore occurred independent of each other, it has been relatively easy to read valuable documents without cancelling value units in accordance with services rendered. This was done by suppressing the cancellation by some manipulation of the cancellation process. The cancellation can for instance be avoided by removing the cancellation head in a card reading device, by a defective cancellation head, by pulling out the value document quickly before the cancellation has started or by short-circuiting the cancellation etc. Thus, by using the same valuable document several times, the service may be rendered without being paid for. Desirably, this should be prevented.

SUMMARY OF THE INVENTION

The present invention is a method and apparatus for validating a valuable documents such as a debit card. The valuable document includes a plurality of value markings arranged to form a code word. Illustratively, the value markings may be optical elements capable of diffracting incident optical radiation. Alternatively, the value markings may be electrical elements such as safety fuses, diodes, or transistors, the presence or absence of the electrical element representing a logic "1" or logic "0", respectively.

In accordance with the present invention, the code word is first read to determine if it is valid. If the code word is valid, one or more value markings are erased, in each of a plurality erasing steps, until, illustratively, after the final erasing step, all of the value markings are erased. After each erasing step, the erased and remaining unerased value markings form a new code word. If the sequence of new code words corresponds to a predetermined sequence of code words a signal is produced. Illustratively, the signal serves to release services corresponding to a cash value represented by the predetermined sequence of code words.

Thus, the valuable document is protected by a double code. The first code is contained in the arrangement of value markings comprising the initial code word. The second code is the sequence of code words produced by the successive erasing steps. The two codes together provide a large number of combinations and strong protection against forgery.

BRIEF DESCRIPTION OF THE DRAWINGS

Illustrative embodiments of the invention are illustrated in the following drawings.

The same reference numerals are used to designate the same parts in all Figures.

DETAILED DESCRIPTION OF THE INVENTION

On a valuable document, a multitude of value markings may be located. A number of value markings, for example eight value markings, form a code word. Each value marking represents a letter of the code word and has a discrete value taken from a predetermined set of discrete values. For example, the value marking may have one of three discrete values "0", "1" or "2". Usually, binary value markings are used. Each binary value marking then represents one bit of a binary code word and has one of the two discrete values "0" or "1". In case of a total decoding, all value markings of the code word are validated and erased, while in case of a partial decoding, only part of these value markings are validated and erased. The use of total decoding is better since it is more secure. The supplier of valuable documents assigns to each customer his own code word that is valid only for this customer.

In the simplest case, each value marking on a valuable document comprises a cell of a constant value memory where a bit value "1" or "0" is stored. The erasing of value markings occurs either by cancellation of the intelligence content "1" or "0" of the appropriate cell or, more securely, by a total destruction of the cell. The constant value memory is, for example, a mechanical, an electrical, an electro-magnetic, a magnetic, an optical, or another kind of constant value memory. An electrical constant value memory comprises, for example, a set of safety fuses, a set of diodes that can melt, or a set of transistors that can melt, the set forming a PROM (programmable read only memory"). Existing safety fuses, diodes and transistors, respectively, represent, for example, a bit value "1", while missing safety fuses, diodes and transistors, respectively, represent a bit value "0". Each of these elements is then a cell of the constant value memory. The erasing or cancelling of a cell occurs in this case, for example, through use of a current of, for example 100 mA, that is sent through the appropriate safety fuse, diode or transistor, respectively, in order to destroy it. Commercially available are, for instance, EAROMs ("electrically alterable read only memories") or EEPROMs ("electrically erasable programmable read only memories"). However, the cells of said EAROMs and EEPROMs are usually programmable multiple times and are generally of limited use for the applications contemplated herein, since they can be used multiple times.

Typically, the use of electrical constant value memory cells as value markings, may by themselves provide limited protection against forgery. Often additional genuineness markings are used in connection with the electrical constant value memory.

A group of especially forgery-proof value markings comprises, for example, an optical constant value memory. The cells of the optical constant value memory are formed from a one phase hologram, a kinoform, a one phase-diffraction-grating element, or a one phase structure comprising saw-tooth shaped channels. These optical cells represent, independent of their intelligence content "1" or "0", genuineness characters themselves, so that separate genuineness and value markings are no longer necessary. The cells of the optical constant value memory are then simultaneously value markings and genuineness indicators. The capability of the optical constant value memories in preventing forgeries results from the fact that it is very difficult and expensive to copy such constant value memories and the fact that a forger needs information and knowledge that usually is not available in order to carry out the forgery.

Figure 1:
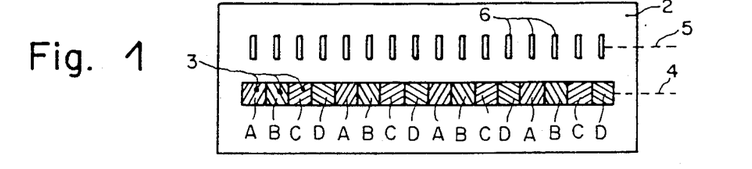
FIG. 1 shows a valuable document with optical value markings.

A valuable document 2 is illustrated in FIG. 1. The valuable document 2 carries a multitude of optical value markings 3 that can be mechanically read. Each of these optical value markings occupies, on the value document 2, a memory cell for an intelligence bit. Each value marking causes a predetermined characteristic modification of the path of rays of a test device that is described below by, for instance, diffraction or refraction of a reflected or transmitted coherent ray. In the illustrated embodiment, four different kind of markings A, B, C and D (characterized in the drawing by different shadings) exist on the valuable document 2. Each causes a different kind of modification of the incident light. In the embodiment of FIG. 1, the value markings A, B, C, and D are arranged periodically in the configuration.

ABCD ABCD ABCD ABCD

This configuration forms a series that represents a data trace 4. Parallel to the data trace 4 is a periodic trace 5 that preferably comprises the periodic optical markings 6. Each group of four successive bits A, B, C and D form, for instance, a code word portion that is read sequentially in time.

Figure 2:
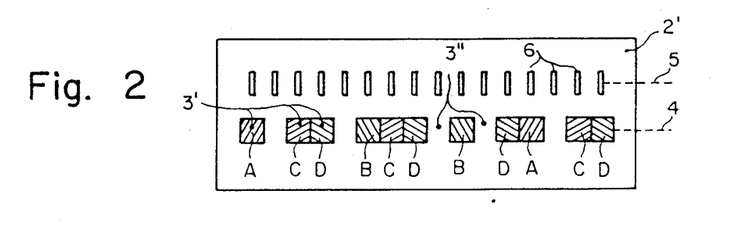
FIG. 2 shows the valuable document of FIG. 1, after some of the value markings have been erased.

In accordance with FIG. 2, coded information is incorporated into the valuable document that is characterized with 2' in FIG. 2 by erasing particular value markings 3''. With the expression "erasing" we mean that the value markings 3'' are either made to disappear totally or they are transformed in such a manner that they will not cause the same characteristic modification of the incident light as the remaining value markings 3'. The erasing of the value markings 3'' can, for instance, occur by a thermal, chemical or mechanical means. Preferably, the code used herein, in accordance with the present invention, will be chosen so that the coded intelligence can not be transformed in a sensible manner by unauthorized erasing of other value markings 3'. In the illustrated embodiment, the remaining value markings 3' are arranged in the configuration A-CD-BCD-B-DA-CD. "-" indicates a space that is caused by the erasing of a value marking 3''.

If a name $\overline{A}, \overline{B}, \overline{C}$ or $\overline{D}$, is assigned to an erased value marking A, B, C or D respectively, then the word $A\overline{B}CD\overline{A}BCD\overline{AB}\overline{C}DA\overline{B}CD$ is stored in the data trace 4. This word can, for instance, be used as code word for testing genuineness. In this case, information is stored in a memory of the device used to read the valuable document. The information stored in the reading device indicates a particular configuration or arrangement of the markings A, B, C and D. When identifying the valuable document 2', it is tested in the reading device to see if the configuration of the value markings 3' carried on the document 2' corresponds to the particular configuration stored in the reading device. In the case of a correspondence, the value document 2' is considered genuine and belonging to the installation, in the case of a non-correspondence, however, the valuable document 2' is rejected.

Figure 3:
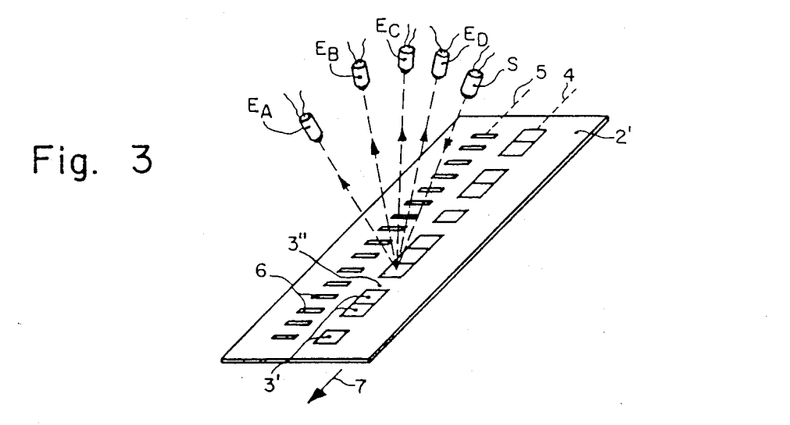
FIGS. 3 and 4 schematically illustrate an optical apparatus for reading optical value markings.
Figure 4:
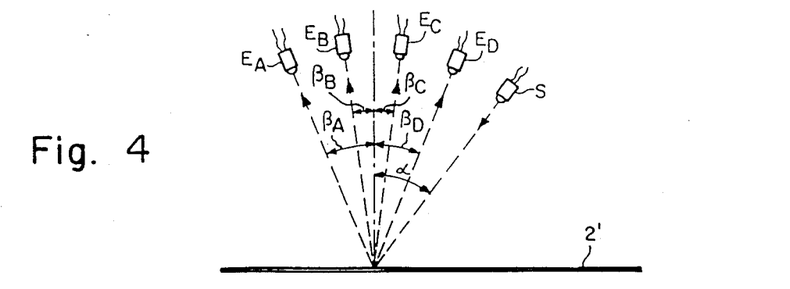

Referring to FIGS. 3 and 4, an embodiment of an input part of a reading device for valuable documents 2' is described for the case where the value markings 3' of the valuable documents 2' are reflecting phase-diffraction grating elements. Illustratively, as shown in FIGS. 1 and 2, the lines of these diffraction grating elements A, B, C, and D are oriented at an angle relative to the direction of the data trace 4 and the diffraction grating elements A, B, C and D differ in the line density N. In a plane that is vertical (i.e. perpendicular) to the lines of the diffraction grating elements and to the surface of the valuable documents 2', a light source 5, and four light receivers $E_A$, $E_B$, $E_C$ and $E_D$ are arranged (see FIGS. 3 and 4). The light source S, transmits optical radiation that falls, through a mask (not shown) onto the valuable document 2' and illuminates an area of the data trace 4 that corresponds to the outer borders of the value markings 3' and 3'', respectively. The valuable document 2' is moved in the direction of the arrow 7 and so that the value markings are read in series. The light rays that are incident onto the value document 2' have an angle of incidence $\alpha$ and have a wave-length $\lambda$ in the visible or non-visible range. When this radiation is incident onto the value marking 3', it is diffracted into a plurality of diffraction orders. The relation $$\sin \beta = N\lambda - \sin \alpha$$

relates the angle of reflection $\beta$ to the angle of incidence $\alpha$, the wave-length $\lambda$, and the line density N of the particular value marking 3'.

The light receivers $E_A$ through $E_D$ are positioned at the spatial angles $\beta_A$, $\beta_B$, $\beta_C$ and $\beta_D$ respectively, that are determined according to this relation. In case of an optical scanning of a value marking 3' of the kind A, the light receiver $E_A$ is thus excited. In case of the scanning of a value marking 3' of the kind B, the light receiver $E_B$ receives a signal etc. However, if the scanned area of the document 2' has no value markings 3' of the kind A, B, C or D, none of the light receivers $E_A$ through $E_D$ receives a signal that is strong enough to excite switching networks connected to the light receivers. With at least one light receiver (not shown) that is arranged at a position corresponding to the zero diffraction order of the diffraction grating elements, the absence of a value marking 3' can be detected.

In a particular embodiment of the invention the value markings 3' may all be of the same kind. For example, all the value markings of the kind A. In this case, the code word is less forgery-proof, but its validation takes only one light receiver $E_A$ instead of four light receivers $E_A$, $E_B$, $E_C$ and $E_D$.

Figure 5:
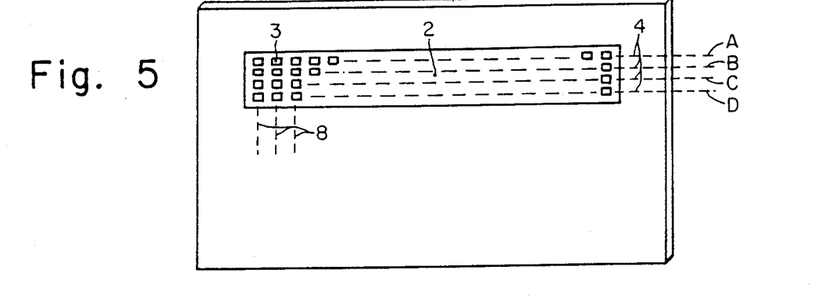
FIG. 5 shows another embodiment of a valuable document.

The code word portions ABCD used in FIG. 1 have the quality that their bit values can be read sequentially in time. If the single data trace 4 of FIG. 1 is replaced by four parallel data traces, i.e. a data trace A, a data trace B, a data trace C and a data trace D, as illustrated in FIG. 5, then all four value markings A, B, C and D of a code word ABCD can be read and validated in parallel and simultaneously. In FIG. 5, for instance, each column 8 of four simultaneously read value markings 3 represents a four-bit-code word ABCD. The individual columns 8 and thus also the individual code word ABCD can be read and validated successively. In general, a code word may have more than four bits. In general, a code word has n bits, n being an integer number.

In the following it is assumed that a constant value memory has n cells and that an initial code word is formed using m cells. The remaining (n-m) positions or cells in the code word stay unacknowledged. In particular examples, the integer value n equals the integer value m.

In accordance with the present invention, the validation of the valuable document and cancellation or erasure of value markings in accordance with services or products purchased occurs in the following steps:

In a first process step, also called recognition step, the code word is read to determine if the document is genuine. The receiver $E_A$, for instance (see FIGS. 3 and 4), only receives a signal that lies within a predetermined, associated tolerance band when the validated value marking is a genuine optical value marking of the kind A. If the document passes the genuineness test, the following process steps that start with an erasing step take place. Otherwise, the reading device is blocked without erasing of value markings. The latter is necessary, since otherwise, a correct value document that was inserted into a wrong reading device by mistake, would be erased unjustifiably. The result of the code word reading may be indicated by a signal light, so that the user will know if the value document was accepted by the reading device or not.

If the result of the recognition step (i.e. the code word reading step) is positive, it is followed by at least two successive erasing steps. During each of these steps, one or more value markings are erased. The one or more value markings that are erased during each erasing step is may be determined by intelligence that is stored in the valuable document 2'. Such intelligence may comprise arrangements and/or series of value markings on the valuable document 2' or may comprise connections between value markings on the valuable document 2'. Illustratively, in at least one erasing step, at least two value markings are erased. Typically, there are a number of successive erasing steps, until after the last erasing step all value markings are erased.

Example: When m=4, the erasing of m=4 value markings occurs in, for example three erasing steps. In accordance with a predetermined sequence, during the first erasing step a specific value marking is erased, during the second erasing step two other specific value markings, during the third erasing step the remaining fourth value marking is erased.

A value marking is defined as erased when the signal that is read and caused by the value marking lies within a certain defined tolerance associated with an erased value marking.

After each erasing step, the erased and remaining non-erased value marking for a new code word, which is read using a reading device.

After the last erasing step, a release-signal (that corresponds for example to a predetermined money value of the original code word) is produced only when, the sequence of new code words produced by the successive erasing steps corresponds to a predetermined sequence of code words.

This method provides additional protection against forgery or other undesired manipulation The additional protection against manipulations is due to the fact that the original codeword existing on the value document is not directly used to produce a release-signal. Instead an arrangement of value markings that are erased in a sequence of erasing steps are used to produce a release-signal. The erasing step sequence is thus part of the decode-operation. The intelligence existing in the original code word is read only after a series of erasing steps with a genuineness check after each erasing step. An abusive prevention of the cancellation of value markings thus automatically prevents the production of a release-signal as well, and thus prevents the release of the desired service. Furthermore, a storage cell that was accepted once is erased even before the acceptance. Furthermore, it is inherent in the examples of the inventive method discussed herein that value markings representing cash values are erased before the release signal is produced, thus insuring that the same value marking cannot be used again as payment.

Figure 6:
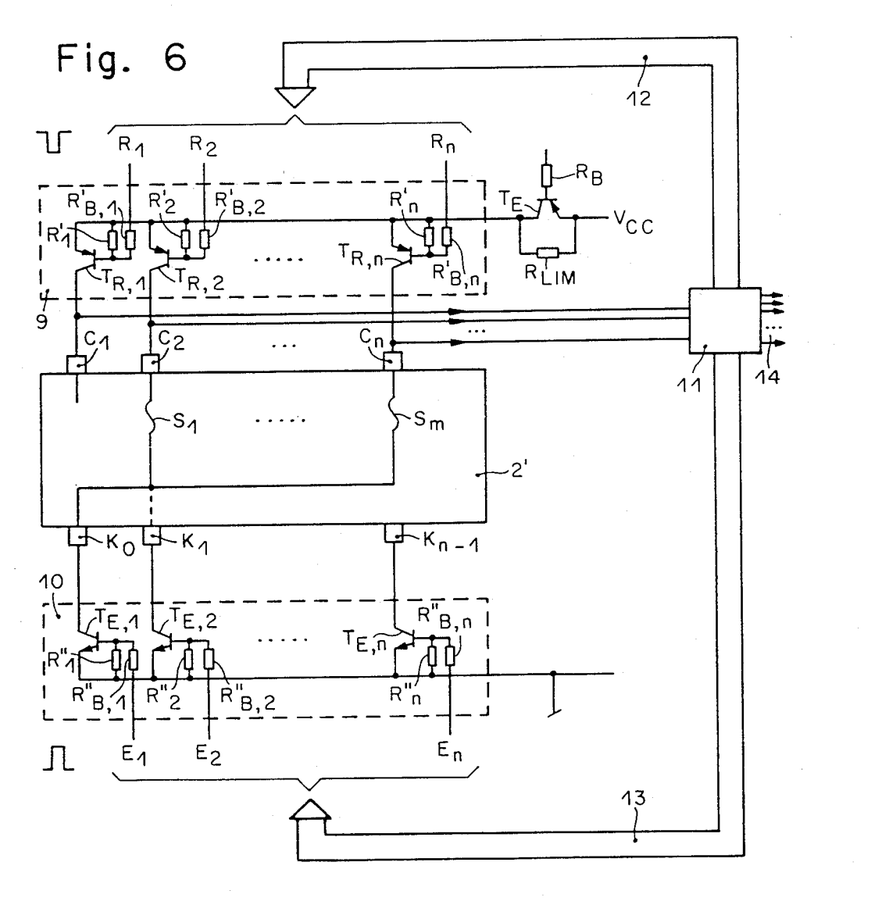
FIG. 6 shows an apparatus for validating valuable documents.
Figure 7:
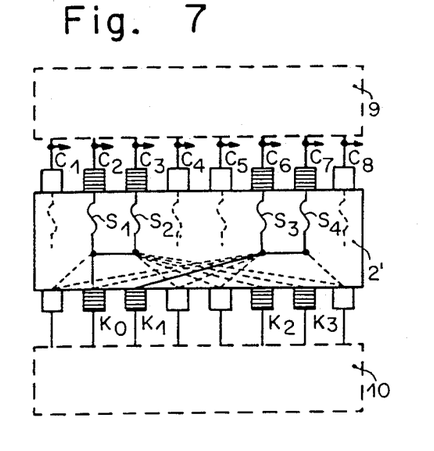
FIG. 7 shows an apparatus for validating a valuable document and a valuable document having a first coding variant.
Figure 8:
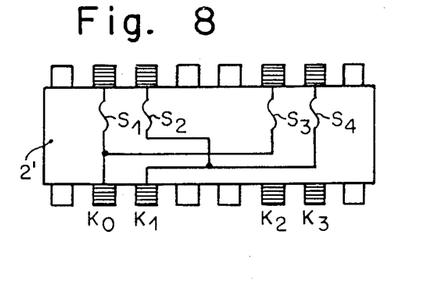
FIG. 8 shows a valuable document having a second coding variant

In the following, the method described above shall be illustrated in connection with the illustrative embodiment shown in FIGS. 6 through 8. In FIGS. 6 and 7, an apparatus for reading and erasing value markings on valuable documents is shown along with an associated valuable document 2'. In FIG. 8, one valuable document 2' is shown. In the illustrations of al three FIGS. 6 through 8, the constant value storage cells that are formed on the valuable document 2', for reasons of simplicity, safety fuses $S_1$ through $S_m$ where in the FIGS. 7 and 8 m=4. It is assumed that the constant value memory can comprise at the most n storage cells $C_1$ through $C_n$ with n=8 in the FIGS. 7 and 8. However, there are only m=4 safety fuses $S_1$ through $S_4$ are present and the following arrangement is assumed:

$$(S_1, S_2, S_3, S_4) \rightleftarrows (C_2, C_3, C_6, C_7),$$

or in other words: safety fuse $S_1$ corresponds to the memory cell $C_2$, safety fuse $S_2$ corresponds to the memory cell $C_3$, safety fuse $S_3$ corresponds to the memory cell $C_6$, and safety fuse $S_4$ corresponds to the memory cell $C_7$.

If a safety fuse $S_1$ through $S_m$ is present, then the associated bit has, f. ex., a binary value "1", however, if one of these safety fuses is absent, then said associated bit has a binary value of "0". The presence or absence of safety fuses $S_1$ through $S_m$ on the value document $2'$ is each time determined through use of a reading-circuit 9 that is contained in the reading device of FIGS. 6 and 7. If a current of, for example, 1 mA that is supplied by the reading-circuit 9 flows through a safety fuse (which is for example determined through use of a voltage measurement that is not illustrated here), then the respective safety fuse is characterized as being present. An erasing circuit 10 is also present in the apparatus of FIGS. 6 and 7. If a current of, for example, 100 mA that is supplied through use of the erasing circuit 10 flows through the safety fuses, the safety fuses will be destroyed and the associated intelligence will be erased.

The reading-circuit 9 and the erasing-circuit 10, as shown in FIG. 6, each comprise, for instance, n bi-polar transistors $T_{R,1}$ through $T_{R,n}$ and $T_{E,1}$ through $T_{E,n}$, respectively. The index R means "read" and the index E means "erase". The n transistors of one circuit are, for instance, NPN-transistors and the other transistors are PNP-transistors. In FIG. 6, the valuable document $2'$ has n connections on top that are connected to the upper connections of the safety fuses. On the bottom, said value document $2'$ has n connections $K_o$ through $K_{n-1}$ that are selectively connected to the lower connections of the safety fuses. The upper connections of the valuable document $2'$ are, each connected to the collector of one of the transistors $T_{R,1}$ through $T_{R,n}$ and to an input of a control and decision unit 11. A pole $V_{CC}$ of a supply voltage (the other pole of said supply voltage is grounded) is connected by way of a parallel circuit comprising a limiting-resistor $R_{Lim}$ and the emitter-collector path of another bipolar transistor $T_E$, to the interconnected emitters of all the transistors $T_{R,1}$ through $T_{R,n}$ of the reading-circuit 9. All emitters of the transistors $T_{E,1}$ through $T_{E,n}$ of the erasing-circuit 10 are grounded. The n lower connections $K_o$ through $K_{n-1}$ of the value document $2'$ are each connected to the collector of one of the transistors $T_{E,1}$ through $T_{E,n}$. The circuit illustrated in FIG. 6 has n read-inputs $R_1$ through $R_n$ and n erase-inputs $E_1$ through $E_n$ that are each connected, by way of one of the voltage dividers $R'_{B,1};R'_1$ through $R'_{B,n};R'_n$ and $R''_{B,1};R''_1$ through $R''_{B,n};R''_n$, to the base of one of the transistors $T_{R,1}$ through $T_{R,n}$ of the reading-circuit 9 and $T_{E,1}$ through $T_{E,n}$ of the erasing-circuit 10. Each voltage divider $R'_{B,1};R'_1$ through $R'_{B,n};R'_n$ and $R''_{B,1};R''_1$ through $R''_{B,n};R''_n$, respectively, comprises two resistors $R'_{B,1}$ and $R'_1, \ldots, R'_{B,n}$ and $R'_n$, $R''_{B,1}$ and $R''_1, \ldots, R''_{B,n}$ and $R''_n$, respectively. The shared pole in each voltage divider is led to the base of the associated bi-polar transistor, while the other pole of the resistors $R'_1$ through $R'_n$ is connected to the emitter of the transistors $T_{R,1}$ through $T_{R,n}$ and the other pole of the resistors $R''_1$ through $R'_n$ is grounded. The base of the transistor $T_E$ is controlled by way of a base-resistor $R_B$. In the illustration of FIG. 6, the read-inputs $R_1$ through $R_n$ are controlled with negative pulses and the erase-inputs $E_1$ through $E_n$ are controlled with positive pulses. A first n-bit-output of the control and decision unit 11 is connected, over a first bus-connection 12, to the n- read-inputs $R_1$ through $R_n$ and a second n-bit-output of the control and decision unit 11 is connected, over a second bus-connection 13, to the n erase-inputs $E_1$ through $E_n$ of the apparatus. The control and decision unit 11 also has another bus-output 14.

The n upper connections of the value document $2'$ are, in accordance with a chosen arrangement.

$$(S_1, S_2, S_3, \ldots, S_m) \rightleftarrows (C_x, C_y, C_z, \ldots C_w),$$

connected to the upper poles of the present safety fuses $S_1$ through $S_m$, while the n lower connections $K_o$ through $K_{n-1}$ of the value document $2'$ are, also in accordance with the chosen arrangement of fuses and the chosen erase-sequence, connected to the lower poles of the present safety fuses $S_1$ through $S_m$.

In order to read, all transistors $T_{E,1}$ through $T_{E,n}$ of the erase-circuit 10, are conducting and the transistors $T_{R,1}$ through $T_{R,n}$ of the read-circuit 9 are all either simultaneously or successively made conducting, while the transistor $T_E$ is not conducting. The current that is then flowing is limited by the limiting-resistor $R_{Lim}$ to, for example, 1 mA. This current can not destroy any safety fuse $S_1$ through $S_m$. Then, at the inputs of the control and decision unit 11 there appears, either simultaneously or successively, the binary values of the individual bits of the code word. In order to erase, all transistors $T_{R,1}$ through $T_{R,n}$ of the read-circuit 9, for example, are conducting and the transistors $T_{E,n}$ of the erase-circuit 10 are successively made conducting, while the transistor $T_E$ is this time conducting and short-circuits the limiting resistor $R_{Lim}$.

FIG. 7 is a simplified illustration of FIG. 6. For FIGS. 7 and 8, the following is valid:

The original constant value memory can store a code word comprising n=8 bits:
$C_1 \ C_2 \ C_3 \ C_4 \ C_5 \ C_6 \ C_7 \ C_8$,
wherein $C_1$ through $C_8$ only have binary values. A code word comprising of m=4 predetermined bits may be formed from four safety fuses:
$S_1 \ S_2 \ S_3 \ S_4$.

Between the two code words, in the two FIGS. 7 and 8, the following mapping is valid:

$$(S_1, S_2, S_3, S_4) \rightleftarrows (C_2, C_3, C_6, C_7),$$

i.e. safety fuse $S_1$ corresponds to memory cell $C_2$, safety fuse $S_2$ corresponds to memory cell $C_3$, safety fuse $S_3$ corresponds to memory cell $C_6$ and safety fuse $S_4$ corresponds to memory cell $C_7$. This arrangement is realized in FIGS. 7 and 8 by the fact that the upper poles of the safety fuses $S_1$ through $S_4$ are associated with the cells $C_2$, $C_3$, $C_6$ and $C_7$ respectively, by means of the shaded upper connections on the valuable document $2'$ as shown in FIG. 7.

It is assumed that, for FIGS. 7 and 8, the same erasing-sequence is used. Illustratively, in both cases two value marks are erased during each erasing step. After two erasing steps, all m=4 value markings are erased. The erasing sequence is stored in the value documents $2'$ by the fact that the lower poles of the four safety fuses $S_1$ through $S_4$ are, on the value document $2'$, interconnected in pairs. These internal connections correspond to the already mentioned intelligences on the value document 2' that among others determine, which of the predetermined value markings is erased during each erasing-step. In FIG. 7, f. ex., the lower poles of $S_1$ and $S_2$ on one hand and of $S_3$ and $S_4$ on the other hand are interconnected.

The m=4 predetermined bits can be erased in varying predetermined sequences. Each of these sequences is then associated to a certain cash-value. For instance, a first cash-value, $1., corresponds to the sequence $S_1 S_2 S_3 S_4$, $\overline{S}_1 \overline{S}_2 S_3 S_4$ and $\overline{S}_1 \overline{S}_2 \overline{S}_3 \overline{S}_4$, a second cash value, for example $5., corresponds to the sequence $S_1 S_2 S_3 S_4$, $\overline{S}_1 S_2 \overline{S}_3 S_4$ and $\overline{S}_1 \overline{S}_2 \overline{S}_3 \overline{S}_4$, and a third cash value, for example $1., corresponds to the sequence $S_1 S_2 S_3 S_4$, $\overline{S}_1$, $S_2 \overline{S}_3 \overline{S}_4$ and $\overline{S}_1 \overline{S}_2 \overline{S}_3 \overline{S}_4$. The three code word combinations, within each sequence, represent the original code word written onto the value document, the codeword remaining after the first erasing step and the codeword remaining after the second erasing step. $S_1$, $S_2$, $S_3$ and $S_4$ represent the erased bits, i.e. the destroyed safety fuses. As can be easily seen in each sequence of codewords, the combination $S_1 S_2 S_3 S_4$ is always the original codeword and the combination $\overline{S}_1 \overline{S}_2 \overline{S}_3 \overline{S}_4$ is always present after the last erasing-step. In the value document 2' of FIG. 7, the first cash-value is stored, because first the two safety fuses $S_1$ and $S_2$ are destroyed and then the two other safety fuses $S_3$ and $S_4$ are destroyed. In the value document 2' of FIG. 8 however, the second cash-value is stored, because first the two safety fuses $S_1$ and $S_3$ are destroyed and then the two other safety fuses $S_2$ and $S_4$ are destroyed. This is caused by the fact that in FIG. 8 the lower poles of the safety fuses $S_1$ and $S_3$ on one hand and the lower poles of the safety fuses $S_2$ and $S_4$ on the other hand are interconnected.

Illustratively, the erasing steps may be successively carried out by successively activating the lower connections KO, K1, K2, K3 of the valuable document 2' in a predetermined sequence in such a manner that first the safety fuses $S_1$ through $S_4$ that are connected to $K_o$ are destroyed, then the ones connected to $K_1$, then the ones connected to $K_2$ and finally the ones connected to $K_3$.

With m=4, there is, besides the mentioned erasing sequence of the two double-erasings, another erasing sequence with four single-erasings, an erasing sequence with two single- and one double-erasing and an erasing sequence with a single and a triple-erasing. Each of these erasing sequences can be associated to another customer group. A customer-code is thus a double code and characterized:
  on one hand by an original code word formed in a constant value memory comprising value markings and
  on the other hand by an erasing sequence chosen from a multitude of possible erasing sequences.
Those two code components are equally important in order to attain a high degree of forgery- and manipulation safety and to attain a large multitude of combinations. The above mentioned first code component of the double code is tested only in the first process step, in the so-called recognition step, while the second code component is tested after the individual erasing steps. The cash-value of the original code word is then predetermined for a certain customer by the sequence in which the number of erasings given to a certain customer occurs, so that the customer may have documents of varying value.

The bus-output 14 of the control and decision unit 11 (see FIG. 6) includes a plurality of outputs. Illustratively, a predetermined one of said outputs, a binary value "1", occurs when an especially predetermined cash-value, for instance the cash value 1, is present on the value document 2'. A binary value "1" at another one of these outputs represents the presence of another cash value. To one o these outputs there is also, for instance, the intelligence "value document was not accepted" associated which occurs when in a process step the presence of a false code word was determined.

The control and decision unit 11 provides timing signals for the various process steps. The control and decision unit 11 also serves to determine if the original code word (i.e. the code word read as part of the first process step) and the codewords present after each erasing step are correct and if the sequence of codewords corresponds to a predetermined cash value and, if this is the case, the control and decision unit 11 serves for production of at least one release signal.

Figure 9:
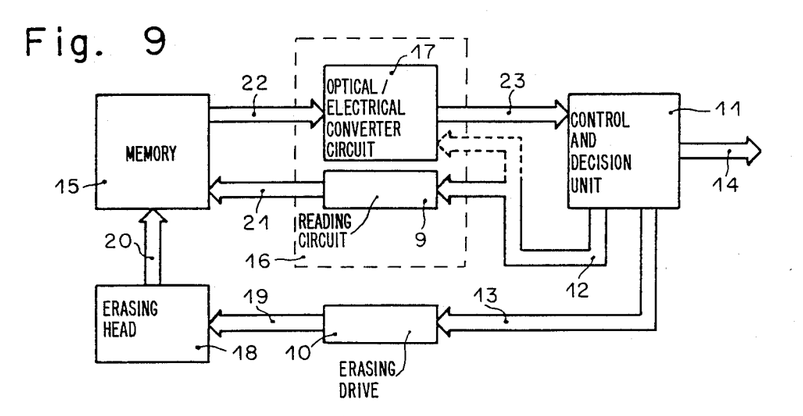
FIG. 9 shows a block diagram of a reading device.

The simple apparatus illustrated in FIG. 6 is suited for valuable documents with simple electrical constant value memories. If a more complex constant value memory is present, as for example an optical constant value memory, then the apparatus illustrated in FIG. 6 may be expanded to the apparatus illustrated in FIG. 9. In FIG. 9, the number 15 characterizes a constant value memory on value document 2'. The apparatus illustrated in FIG. 9, in addition to the apparatus illustrated in FIG. 6, contains a reading head 16 that comprises the reading circuit 9 and the adaption circuit 17. The apparatus of FIG. 9 also includes an erasing head 18. The adaption circuit 17 has sensors and amplifiers illustratively, for transforming optical measurement signals into electrical signals. A first output of the control and decision unit 11 is, by way of the bus connection 12, connected to the control input of the reading circuit 9. The bus connection 12 may also lead to a control input of the adaption circuit 17. A second output of the control and decision unit 11 is, by way of the bus connection 13, led to the erasing circuit 10 and a bus-connection 19 is connected to the control input of the erasing head 18. The output of the erasing head 18 is connected to the erasing inputs of the constant value memory 15 by way of a bus-connection 20. The output of the reading circuit 9 is, by way of a bus-connection 21, connected to a reading input of the constant value memory 15, while the outputs of this constant value memory 15 are, by way of a bus-connection 22, connected to the data-input of the adaption-circuit 17. As indicated above, the circuit 17 may be used to convert optical signals to electrical signals. The outputs of the circuit 17 are connected by way of a bus-connection 23, to the inputs of the control and decision unit 11. The mode of operation of the apparatus illustrated in FIG. 9 is, in principle, substantially the same as the operation mode of the apparatus illustrated in FIG. 6.

Figure 10:
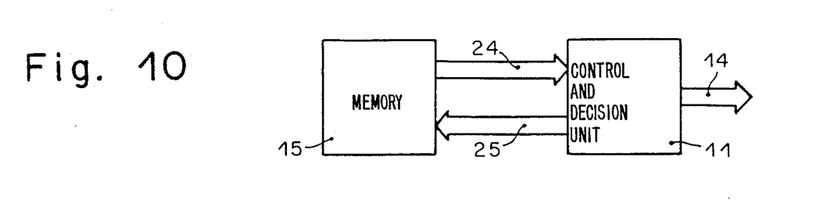
FIG. 10 shows another block diagram of a reading device.

Often, all or part of the functions of the reading head 16, of the erasing head 18 and of the erasing drive 10 can be realized within the constant value memory 15 and/or within the control and decision unit 11. In this case, the circuit illustrated in FIG. 9 reduces itself to the circuit illustrated in FIG. 10 which only comprises the constant value memory 15 and the control and decision unit 11 which are, over a data-bus 24 and a control-bus 25, inter-connected.

A micro-computer is preferably used as control and decision unit 11. The micro-computer has then to be programmed in accordance to the flow chart illustrated in FIG. 11.

Figure 11:
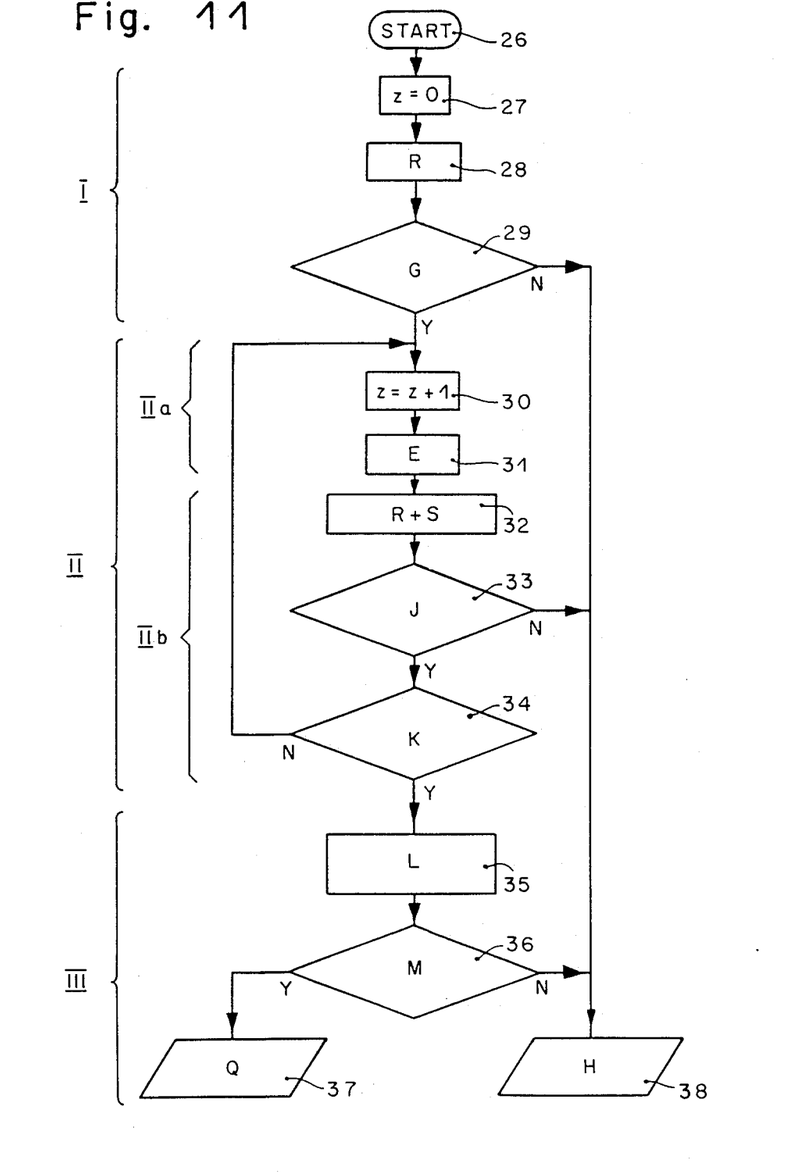
FIG. 11 shows a flow chart used in connection with a reading device that has a micro computer.

This flow chart comprises the sequence of blocks 26, 27, 28, 29 . . . , 37. The blocks 29, 33, 34 and 36 are decision blocks, each having a yes-output Y and a no-output N. The no-outputs N of the blocks 29, 33 and 36 are inter-connected and led to the input of a block 38. The no-output N of the block 34 is connected to the connection that exists between the block 29 and the block 30. The blocks 26 through 29 represent the first process step I, the so-called recognition step. The blocks 30 and 31 represent the erasing steps IIa and the blocks 32 through 34 represent the thereto associated control steps IIb. The blocks 35 through 38 represent a final release and/or blocking step, respectively, III.

The block 26 represents the start of the validation process that begins with the insertion of a valuable document 2' into the reading device. According to block 27, the count value z of a process-step-counter in the micro-computer is then set back to zero. The first process step I thus receives the number "zero". According to block 28, a code word (i.e. the original code word on the valuable document) is then read (R in block 28 means "read") and according to block 29 it is determined if the code word corresponds to a predetermined code word associated with the customer and thus to the reading device. The letter G in block 29 means: "Does the read code word correspond to the code word predetermined for the customer?" If the answer is "no", then the reading device is blocked. In the flow chart, the answer "no" leads to block 28. The letter H in block 38 means: "No acceptance of the value document". However, if the answer is "yes", then the first process step I is finished and the second process step begins which comprises the first erasing step and the associated control step.

According to block 30, the count value z is first incremented one, so that the second process step receives the number "one". According to block 31, the predetermined bits of the code word are then erased (E in block 31 means "erase"). Thus the first erasing step is ended and, according to block 32, the code word remaining after the first erasing step is read and stored. The letters R+S in block 32 mean "read and store". The letter J in block 33 means: "Is the partially erased code word correct?" If the answer to this question is "no", then the reading device will be blocked by way of the no output N of the block 33 and the block 38. However, if the answer is "yes", then, according to block 34, the question is asked "Are all bits of the code word erased?". This question is represented in block 34 by the letter K. Thus the second process step is finished. If the answer to the question is "no", then by way of the N output of the block 34 the process indicated by block 30 through 34 is repeated. This corresponds to the third process step that comprises the second erasing step and the associated control step. This third process step receives the number "two" by incremation of the count value z.

The blocks 30 through 34 are run through again and again until the question of block 34 is answered with "yes". Each new run through of the blocks 30 through 34 represents an additional process step with additional erasing of bit-values. If the answer to the question of block 34 is "yes", then all bits of the code word are erased and the release can occur. First however, it is determined in accordance to the blocks 35 and 36, if the sequence of the erasings corresponds to a predetermined cash value. The letter L in block 35 means: "Decode the sequence of the code words resulting from each successive erasing step" and the letter M in block 36 means: "Is this decoded sequence the same as a predetermined sequence?" If the last question is answered with "no", the reading device will be blocked by way of the no-output N of the block 36 and the block 38. If the answer is "yes" however, then the service is released by way of block 37. This service corresponds to the cash-value which corresponds to the sequence of the code words resulting from the successive erasing steps. The letter Q in block 37 means: "Accept the determined cash value".

By use of this coding system the security of valuable documents is improved since a forged valuable document 2' that survives through the first process step (i.e. the reading of the original code word) without being hindered will very probably be recognized as a forgery in one of the next process steps.

Finally, the above-described embodiment of the invention are intended to be illustrative only. Numerous alternative embodiments may be devised without departing from the scope and spirit of the following claim.

What is claimed is:

1. An apparatus for validating a valuable document including a plurality of value markings arranged to form a first code word, said apparatus comprising;
   means for reading said first code word to determine if said first code word is valid,
   means, responsive to said determination, for erasing in each of a plurality of erasing steps, one or more of said value markings, after each erasing step the erased and remaining unerased value markings forming another code word,
   a control and decision unit for determining if said sequence of other code words resulting from said erasing steps corresponds to a predetermined sequence of code words, and for producing a signal if said determination is affirmative, and
   a reading head and an erasing head for reading and erasing said value markings, a first output of said control and decision unit being connected to a control input of said reading head, a second output of said control and decision unit being connected to a control input of said erasing head, and wherein the outputs of said reading head are led to an input of said control and decision unit.

2. A method for validating a valuable document including a plurality of value markings arranged to form a first code word, said method comprising the steps of:
   reading said first code word to determine if said first code word is valid,
   if said first code word is valid, erasing, in each of one or more successive erasing steps, one or more of said value markings, so that after each erasing step a new code word is formed,
   after each erasing step, determining if the new code word is valid by determining if the new code word corresponds to a predetermined code word from a sequence of predetermined code words, said sequence including a predetermined code word for each erasing step, and
   if after a final erasing step, the sequence of new code words formed as result of the one or more erasing steps corresponds to said sequence of predetermined code words, generating a signal indicative thereof.

3. The method of claim 2, wherein, after the last erasing step, all of the value markings are erased.

4. An apparatus for validating a valuable document including a plurality of value markings arranged to form a first code word, said apparatus comprising:
- means for reading said first code word to determine if said first code word is valid,
- means for erasing one or more of said value markings in each of one or more successive erasing steps to form a new code word after each erasing step,
- means for determining if the new code word formed after each erasing step corresponds to a code word from a sequence of predetermined code words, said sequence including a predetermined code word for each erasing step, and
- means for generating a signal if the sequence of new code words formed by said erasing means corresponds to said sequence of predetermined code words.

* * * * *